United States Patent [19]

Tudor et al.

[11] 4,164,709

[45] Aug. 14, 1979

[54] SIGNAL PRIORITY DEVICE

[76] Inventors: Herbert E. Tudor, 21044 Sunset, Warren, Mich. 48091; Frank F. Hrlic, 31130 Walden Ct. #102, Walled Lake, Mich. 48088

[21] Appl. No.: 808,718

[22] Filed: Jun. 22, 1977

[51] Int. Cl.² .............................................. H04B 1/40
[52] U.S. Cl. ...................................... 325/21; 325/302
[58] Field of Search ........................ 325/15, 18, 20, 21, 325/25, 302, 381; 343/176, 180, 858, 850, 860, 715, 745, 749, 750

[56] References Cited

U.S. PATENT DOCUMENTS

| | | | |
|---|---|---|---|
| 3,277,374 | 10/1966 | Kobayashi | 325/18 |
| 3,729,681 | 4/1973 | Elder | 325/302 |
| 3,887,872 | 6/1975 | Sharpe | 325/21 |
| 3,947,766 | 3/1976 | Kawasaki | 325/25 |
| 3,971,985 | 7/1976 | Arai | 325/302 |
| 4,060,766 | 11/1977 | Kazuo | 325/302 |

Primary Examiner—Robert L. Griffin
Assistant Examiner—Michael A. Masinick
Attorney, Agent, or Firm—Remy J. VanOphem

[57] ABSTRACT

Disclosed herein is a signal priority device responsive to the audio output signal of a citizen band (C.B.) transceiver for switching the response of a common speaker system from the audio output signal of a radio receiver to the audio output signal of the C.B. transceiver. The disclosed signal priority device is connected between the existing audio output jacks of the radio receiver and the C.B. transceiver and a common speaker system, and automatically integrates the operation of the two separate devices. The signal priority device is transparent in the system when either the radio receiver or C.B. transceiver is turned off.

14 Claims, 3 Drawing Figures

SIGNAL PRIORITY DEVICE

BACKGROUND OF THE INVENTION

1. Field of the Invention

The present invention relates to a transceiver combination with a radio or tape recorder, and more particularly to a signal priority device activated in response to an audio output from the transceiver to disconnect a common speaker system from the output of a radio or tape recorder and connects the common speaker system to the audio output of the transceiver.

2. Prior Art

The rapid increase in the popularity and use of citizen band (C.B.) receivers in automotive vehicles has resulted for the most part in the user purchasing and installing a separate C.B. transceiver in the vehicle supplementing an existing radio receiver which had been previously installed at the factory or by the dealer at the time of the vehicle's purchase. Because the radio and C.B. transceiver are separate entities the operator is often faced with a delemma, he can either listen to the radio or the C.B. transceiver, but trying to do both simultaneously is extremely difficult. The near constant output of the radio or a tape recorder has a high probability of interferring with a message being received by the transceiver. This is particularly true if there is a vocal output from the radio; at the same time the message is being received by the transceiver. Effectively, this is the same as two people talking at the same time and it is difficult for a person to immediately "tune one off" and listen to the other. To avoid this problem, the vehicle operator either turns the radio "off" or turns the volume of the output from the radio much lower than the normal level when he wishes to use the transceiver.

The prior art teaches integrated radios and transceivers in which the output from the radio is turned "off" whenever a message is being received by the transceiver. Such integrated radio and transceiver systems are taught by I. Kobayashi in U.S. Pat. No. 3,277,374 (October, 1966) and K. Arai in U.S. Pat. No. 3,971,985 (July, 1976). The circuit arrangements taught by Kobayashi and Arai are only applicable to integrated radio and transceiver, and both use a common final audio output amplifier and speaker system.

However, as previously stated, the majority of vehicles equipped with C.B. transceivers do not have integrated systems and the radio receivers and C.B. transceivers are separate entities. To implement the circuits taught by either Kobayashi or Arai in the existing separate radio receivers and C.B. transceivers owned by these people would require rewiring and/or modification of the existing radio receiver or both the radio receiver and the C.B. transceiver. Most persons are not capable of making this type of modification themselves, and do not care to go through the expense or bother of having an experienced electronic technician do it for them.

The invention is a signal priority device in the form of an interrupter switch connected between the output of the radio receiver, the audio output of the ransceiver and a single common speaker system which may be either a single speaker or a speaker system as is common in many of the vehicles. The speaker system contemplated is normally the one associated with the vehicles radio receiver and/or tape recorder as the case may be. Hereinafter, the term "radio receiver" will include the possibility that the vehicle may also include a separate or integrated tape recorder as is common in many vehicles. There is no need to rewire or modify either the radio receiver or C.B. transceiver. All the interconnections are external to the separate entities and are sufficiently simple so that they can be performed by any person having no minimal electrical or electronic knowledge and skills. The inventive C.B. interrupter effectively performs the same functions as the integrated systems taught by Kobayashi and Arai without having to rewire or modify either component.

SUMMARY OF THE INVENTION

The invention is a signal priority device interconnecting the audio outputs of the radio receiver, and a C.B. transceiver with a common speaker system. The signal priority device has an unactivated state and is switchable to an activated surface in response to an audio output from a C.B. transceiver. The signal priority device connects the output from the radio receiver to the speaker system in the unactivated state. In the activated state, the signal priority device disconnects the speaker system from the output of the radio receiver and connects the speaker system to receive the audio output of the C.B. transceiver. The signal priority device further includes a delay circuit which holds the signal priority device in the activated state for a period of time sufficient to prevent the priority device from returning to the unactivated state during brief interruptions in the audio output from the C.B. transceiver such as a momentary break in the transmission to the C.B. transceiver or a momentary pause in the audio output.

The object of the invention is a signal priority device in the form of an interrupter switch interconnecting the audio output of a radio receiver and a C.B. transceiver with a common speaker system which terminates the response of the speaker system to the output of the radio receiver and transfers the response of the speaker system to the audio output of the C.B. transceiver when a message is being received by the C.B. transceiver.

Another object is a signal priority device which includes a delay circuit maintaining the response of the speaker system to the audio output from the C.B. transceiver during short interruptions in the audio output from the C.B. transceiver.

Another objective is a signal priority device which may be connected between the radio receiver, the C.B. transceiver, and the speaker system without rewiring or modification of either the radio receiver or C.B. transceiver or both.

A final object of the invention is a signal priority device in which all interconnections are external to the radio receiver, C.B. transceiver and the speaker system.

These and other objects of the invention will become apparent from a reading of the specification in conjunction with the figures.

DETAILED DESCRIPTION OF A PREFERRED EMBODIMENT

Figure 1:
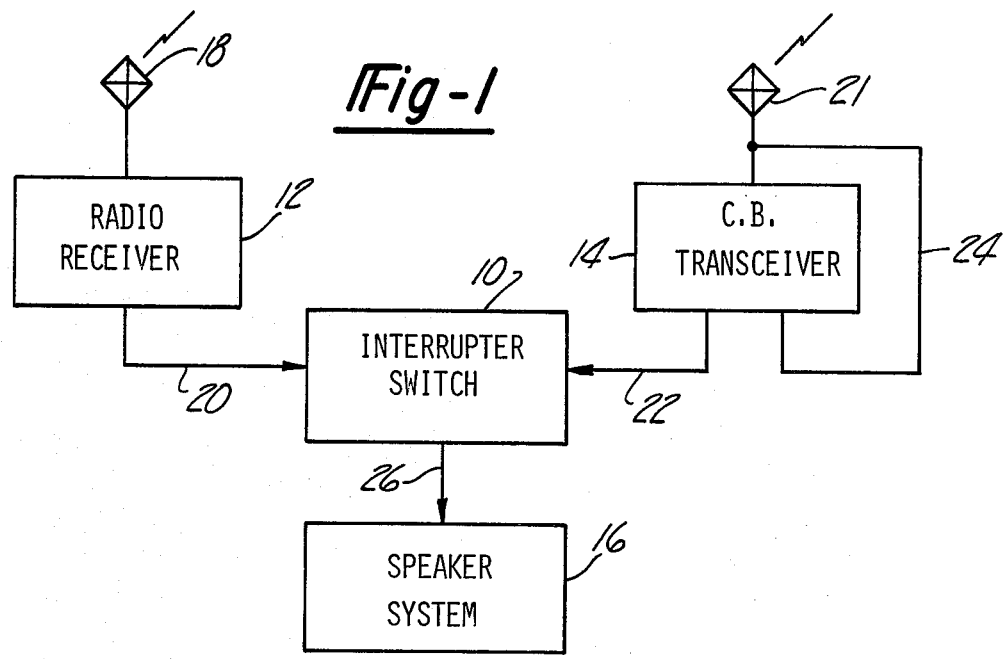
FIG. 1 is a block diagram illustrating the disclosed signal priority device in combination with the radio receiver, the C.B. transceiver and a speaker system.

Referring to FIG. 1 there is shown a block diagram showing the relationship of the disclosed signal priority device 10 with a a radio receiver 12, a C.B. transceiver 14 and a speaker system 16. As previously indicated, the radio receiver 10 may also be a tape recorder or an integrated radio-tape recorder combination as is frequently encountered in automotive vehicles or trucks. Although the invention is disclosed in the context of an automotive vehicle, it is not limited to this environment and is equally applicable to aircraft, boats or other portable communication systems as well in fixed installations such as a home, office, or factory. The speaker system 16 may be a monoral, stereophonic, or quadraphonic as the case may be.

The radio receiver 12 receives a radio signal via an antenna 18 which is amplified and demodulated to produce an audio signal which is communicated to the signal priority device 10 via line 20. Likewise the C.B. transceiver 14 receives a radio signal via antenna 21 which is amplified and demodulated to produce an audio output on line 22 which is communicated to the signal priority device 10. When the C.B. transceiver is in its transmission state, a radio signal is generated on line 24 which is communicated back to the antenna 21. As is well known in the art, the receiver portion of the transceiver 14 is deactivated when the transceiver is placed in the transmitting mode of operation preventing an audio output from appearing on line 22. It is further assumed that the transceiver 14 includes a "squelch circuit" which prevents an audio signal from being generated on line 22 when the signal receiver by antenna 21 is below a predetermined signal level. Squelch circuits of this type are well known in the art and are embodied in most commercially available C.B. transceivers. It is also known that most C.B. transceivers embody internal speakers, but also provide an external audio output jack or connection to permit the audio output to be connected to external speakers. Line 22 represents a connection between the signal priority device 10 and the external audio output "jack" or connection of the C.B. transceiver. The signal priority device 10 has an unactive state in which the output from the radio receiver 12 transmitted along line 20 is connected directly to the speaker system via line 26. The signal priority device 10 is placed in its active state in response to an audio signal from the C.B. transceiver 14 on line 22. In the active state the signal priority device 10 disconnects the speaker system 16 from the signal on line 20 and connects the speaker system to the audio output from the transceiver appearing on line 22 to the speaker system via lines 26. The signal priority device also includes a delay circuit which holds the signal priority device in the active state for a predetermined time after the termination of the audio signal received from the C.B. transceiver on line 22 as shall be explained hereinafter.

Figure 2:
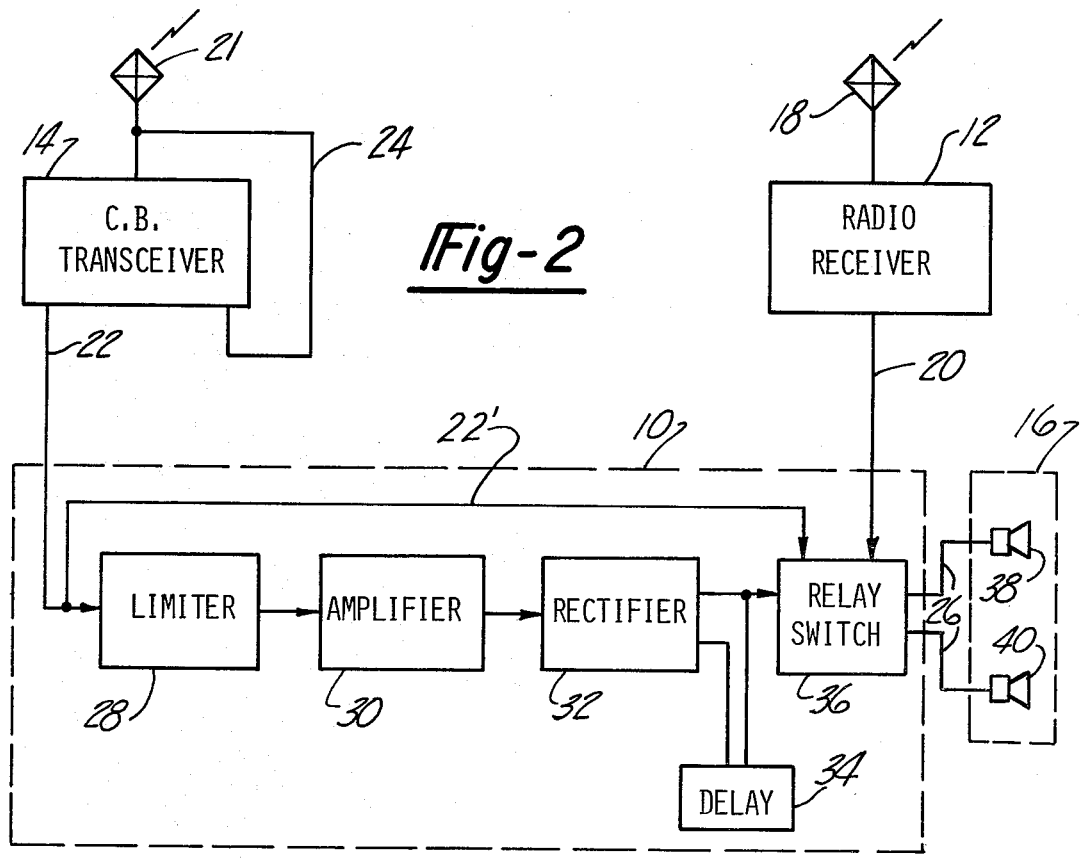
FIG. 2 is a block diagram of the disclosed signal priority device.

Referring to FIG. 2 there is shown a block diagram of the signal priority device. The output from the C.B. transceiver 14 on line 22 is communicated to a limiter circuit 28 and a relay switch 36. The limiter circuit 28 receives the audio signal from line 22 and outputs a signal having the same frequency as the input signal and a predetermined value. The output of the limiter 28 is amplified by the amplifier circuit 30 to produce an amplified signal. This amplified signal is input to rectifier circuit 32 which generates a signal indicative of the output of the amplifier circuit. The output of the rectifier circuit is applied directly to the relay switch 36 and actuates the relay switch from an unactivated state to an activated state. The output of the rectifier circuit 32 is also applied to a delay circuit 34 which stores a signal indicative of the rectified signal and outputs this stored signal for a predetermined time after the termination of the audio input on line 22. The relay switch 36 receives the audio signals from the radio receiver 12 on line 20 and the audio output from the C.B. transceiver on line 22'. In the unactivated state the relay switch 36 connects the output on line 20 to the speaker system, illustrated as stereo speakers 38 and 40 via lines 26. In the activated state, relay switch 36 disconnects the speakers 38 and 40 from the audio signal on line 20 and connects them to the audio signal on line 22'.

The operation of the signal priority device 10 is as follows. When there is no audio output from the C.B. transceiver 14 there is no input signal to the limiter 28, amplifier 30, and rectifier 32, therefore, there is no output signal from the rectifier circuit 32 to activate the relay switch 36. In the unactivated state, the relay switch 36 connects the output of the radio receiver 12 to the speakers 38 and 40 and the speakers 38 and 40 produce the audio output generated by the radio receiver 12. When the C.B. receiver receives a signal above the squelch level, an audio signal is generated on line 22. This audio signal is limited by the limiter circuit 28 and amplified by the amplifier circuit 30 to produce an audio frequency signal of a predetermined value at the rectifier circuit 32. The rectifier circuit 32 rectifies the audio frequency signal to produce a d.c. signal which actuates relay switch 36. In its actuated state, the relay switch 36 disconnects the speakers 38 and 40 from the output from the radio receiver 12 and connects them to the audio output from the C.B. transceiver 14. The delay circuit 34 stores a d.c. signal indicative of the output of the rectifier ciruit and applies this signal to the relay switch 36 for a predetermined time after the termination of the audio signal input from the C.B. transceiver 22. if no further audio signal is received from the C.B. transceiver after the predetermined period of time, the signal from the delay circuit decays to a value which is below the value required to hold the relay switch in the activated state and the relay switch 36 turns to its unactivated state disconnecting the speakers from the output of the C.B. transceiver and reconnecting the speakers back to the output from the radio receiver.

If the operator elects to use only the radio receiver or the C.B. transceiver, he only needs to turn the unwanted device "off", and the signal priority device will effectively be transparent between the selected device and the speakers.

Figure 3:
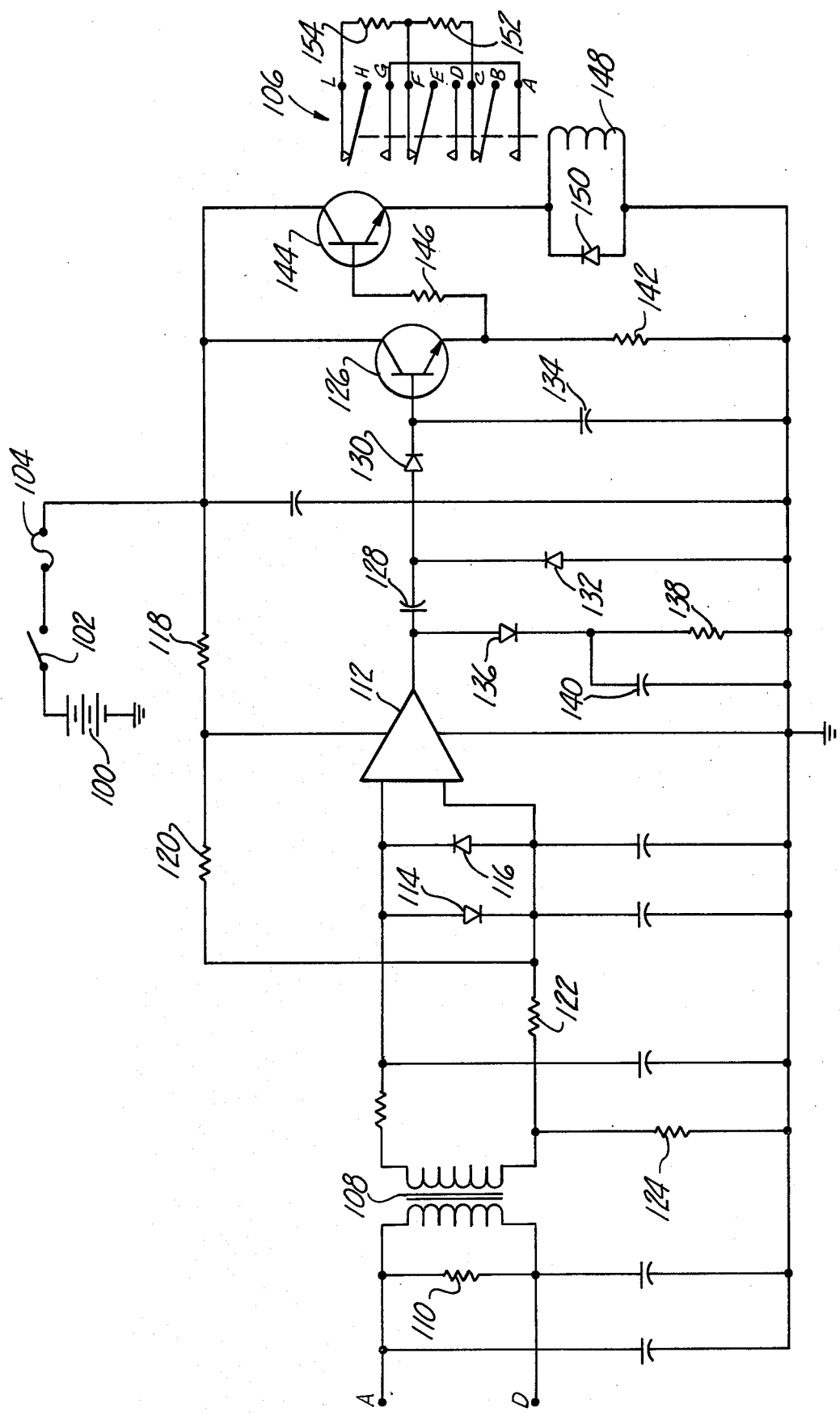
FIG. 3 is a circuit diagram of a preferred embodiment of the signal priority device.

Referring now to the circuit diagram of FIG. 3, power is applied to the circuit from the vehicle's source of electrical power, illustrated as a battery 100 having one end connected to a common or vehicle ground. The source of electrical power may be a battery as illustrated, an alternator or generator as is commonly associated with an engine powered vehicle, or any other d.c. power supply used in connection with the radio receiver or C.B. transceiver. The opposite end of the source of electrical power is connected to the signal priority device through an "on-off" switch 102 such as the ingition switch of an internal combustion engine and a current limiting fuse 104.

The audio signal from the C.B. transceiver is connected to input terminals A and D of the solenoid actuated relay 106 and to the opposite input ends of a transformer 108. Resistance 110 connected between the input terminals of transformer 108 is a load impedance matching the output impedance of the C.B. transceiver with the impedance of the speakers and signal priority device. The output terminals of transformer 108 are connected to the positive and negative inputs of operational amplifier 112. Diodes 114 and 116 are connected in parallel and with opposite polarities between the inputs to operational amplifier 112 and form in conjunction with transformer 108 the limiter circuit 28. Resistances 118, 120, 122 and 124 are connected in series between the source of electrical power and ground and form a voltage divider network providing a predetermined bias potential at the junction between resistances 120 and 122 for the signals applied to the negative and positive inputs to the operational amplifier 112. The operational amplifier 112 and its associated circuitry comprises amplifier circuit 30.

The output of operational amplifier 112 is connected to the base of transistor 126 through capacitance 128 and diode 130. The junction between capacitance 128 and diode 130 is connected to ground by means of diode 132 and the base of transistor 126 is connected to ground through capacitance 134. The junction between the output of operational amplifier 112 and capacitance 128 is connected to ground through series connected diode 136 and resistance 138. Resistance 138 is further paralleled by capacitance 140. This circuit arrangement establishes a bias potential at the output of the comparator amplifier when a signal is being received at its input.

The collector of transistor 126 is connected directly to the source of electrical power and the emitter is connected to ground through resistance 142 and to the base of transistor 144 through a resistance 146. The collector of transistor 144 is connected directly to the source of electrical power and the emitter is connected to ground through the coil 148 to relay switch 106. The diode 150 is connected in parallel with coil 148 to discharge the inductive kick back generated in coil 148 when transistor 144 is turned "off".

The relay switch 106 is illustrated as a solenoid actuated relay having three separate single pole double throw switches. The pole terminal B of the first single pole double throw switch is connected to one input of a first stereo speaker, such as speaker 38. The normally closed contact, terminal C, of the first switch is connected to one input from the radio receiver and to normally closed contact F of the second switch through a resistance 152. Normally open contact, terminal A, of the first switch is connected to one input from the C.B. transceiver.

The pole terminal E of the second single pole double throw switch is connected in common to the other input terminals of the two speakers 38 and 40. The normally closed contact, terminal F is connected to the common stereo output of the radio receiver 12. The normally open contact terminal D is connected to the other input from C.B. transceiver 14.

The pole terminal H of the third single pole double throw switch is connected to one terminal of the other stereo speaker such as speaker 40. The normally closed contact, terminal L is connected to a third output from the radio receiver 12 and to terminal F through a resistance 154. The normally open contact, terminal G is connected to terminal A and the one output from the C.B. transceiver 14. It is recognized that an equivalent arrangement of solid state switches such as taught by Arai in U.S. Pat. No. 3,971,985 could be used in place of the solenoid operated relay switch illustrated.

The operation of the circuit is as follows. With no input from the C.B. transceiver 14 there is no a.c. output from the operational amplifier 112 and no base current is applied to the base of transistor 126. Transistor 126 is nonconductive and the emitter terminal assumes a ground potential. This ground potential is applied to the base of transistor 144 placing it in the nonconductive state. With transistor 144 in the nonconductive state, no current flows through relay coil 148 and switch 106 remains in the inactive state. Normally closed contacts, terminals C, F and L receiving the audio signals are transmitted to pole contacts B, E, and H applying these signals to speakers 38 and 40.

An output from the C.B. transceiver is applied to terminals A and D and the input terminal of transformer 110. The output of transformers 110 is an a.c. signal applied to the inputs of operational amplifier 112. Diodes 114 and 116 limit the magnitude of the a.c. signals across the inputs of the operational amplifier to one diode drop or approximately 0.6 volts. This a.c. signal is amplified by the operational amplifier 112. The amplified a.c. signal is passed by capacitance 128 and is half wave rectified by diode 130 to produce a d.c. current forward biasing transistor 126 into conductance. A potential drop is thus generated across resistance 142 forward biasing transistor 144 into conductance providing current flow through relay coil 148. This activates relay 106 causing the normally closed contacts to open and the normally open contacts to close. The speakers 38 and 40 are thus disconnected from the output of the radio receiver and connected to the output of the C.B. transceiver 14 through terminals A, D and G.

A portion of the current rectified by diode 130 also charges capacitance 134 to a value predetermined by the R.C. time of capacitance 140 and resistance 138. When the audio output signal from the C.B. transceiver is terminated capacitance 134 starts to discharge through the base emitter connection of transistor 126 and resistance 142. The discharge of capacitance 134 maintains transistor 126 in the conductive state for a period of time predetermined by the charge on capacitance 134 and the impedance of the discharge circuit. The conductance of transistor 126 holds transistor 144 in the conductive state which maintains the energization of relay coil 148 for a predetermined time after the audio signal from the C.B. transceiver is terminated. After capacitance 134 discharges to a second predetermined value, the current passing through transistor 144 and relay coil 148 is insufficient to keep the switch 106 in the actuated state and the switches return to their initial positions returning the connection between the speakers and the output from the radio receiver.

Having described the concept of the disclosed signal priority device with reference to a specific circuit embodiment, it is not intended that the invention be limited to the circuit shown and described herein. It is recognized that one skilled in the art could devise other circuits to perform the same functions and that the solenoid operated switch could be replaced by a solid state switch without departing from the spirit of the invention.

What is claimed is:

1. A communication system comprising:

means for generating a first electrical signal at a speaker output terminal;

a transceiver for generating a second electrical signal indicative of an audio output at a speaker output terminal;

at least one speaker for converting said first and second electrical signals to an audio output; and signal priority means interconnecting the output terminals of said means for generating and said transceiver with said at least one speaker, said signal priority means receiving said first and second electrical signals, said signal priority means having a first state transmitting said first electrical signals to said at least one speaker, and switchable to a second state in response to said second signal, said signal priority means transmitting said second signal to said same at least one speaker;

wherein said signal priority means further includes delay means for holding said signal priority means in said second state for a predetermined time after the termination of said second electrical signal; and wherein said priority means comprises:

limiter means receiving said second electrical signal for generating a limited output signal having a predetermined value;

amplifier means for amplifying said limited output signal, to generate an amplified signal;

rectifier means for rectifying said amplified signal to generate a rectified signal indicative of the value of said amplified signal;

delay means, receiving said rectified signal, for generating a delay signal for a predetermined time after the termination of said second signal; and switch means receiving said first and second electrical signals, said switch means having a first state outputting said first signal to said at least one speaker, said switch means switchable to a second state in response to said rectified and delay signals, said switch means in said second state outputting said second signal to said same at least one speaker.

2. The communication system of claim 1 wherein:
said means for generating is a radio receiver; and
said transceiver is a C.B. transceiver.

3. The communication system of claim 1 wherein:
said means for generating is a tape recorder; and
said transceiver is a C.B. transceiver.

4. The communication system of claim 1 wherein: said means for generating is a radio receiver and a tape recorder; and
said transceiver is a C.B. transceiver.

5. The communication system of claim 1 wherein said switch means is a solenoid actuated relay switch.

6. The communication system of claim 1 wherein said switch means is a solid state switch.

7. The communication system of claim 1 wherein said at least one speaker is more than one speaker.

8. In combination with a first means generating a first signal at a speaker output terminal, a transceiver having a squelch circuit for generating a second signal, a speaker output terminal and at least one speaker, an interrupter switch interconnecting the speaker outputs from said first means and said transceiver with the at least one speaker, wherein said interrupter switch has a first state connecting the at least one speaker to the speaker output terminal of said first means and switchable to a second state in response to an output at the speaker output terminal of said transceiver, said interrupter switch in said second state connecting the at least one speaker to the output terminal of the transceiver, wherein said interrupter switch comprises limiter means receiving said second signal from the speaker output terminal of the transceiver for generating a limited output signal having a first predetermined value; amplifier means for amplifying said limited output signal; rectifier means for converting said amplified signal to a d.c. signal; delay means, receiving said d.c. signal, for generating a delay signal a predetermined time after the termination of the second signal; and switch means having a first state and switchable to a second state in response to said d.c. signal, said switch means connecting the at least one speaker to the speaker output terminal of means for generating a first signal in said first state and connecting the speaker to the speaker output terminal of the transceiver.

9. The combination of claim 8 wherein said switch means is a solenoid actuated relay switch.

10. The combination of claim 8 wherein said switch means is a solid state switch.

11. The combination of claim 8 wherein said at least one speaker is more than one speaker.

12. The combination of claim 8 wherein the means for generating a first signal is a tape recorder.

13. The combination of claim 8 wherein the means for generating is a radio receiver.

14. The combination of claim 13 wherein the radio receiver further includes a tape recorder.

* * * * *

UNITED STATES PATENT AND TRADEMARK OFFICE
CERTIFICATE OF CORRECTION

PATENT NO. : 4,164,709

DATED : August 14, 1979

INVENTOR(S) : Herbert E. Tudor and Frank F. Hrlic

It is certified that error appears in the above-identified patent and that said Letters Patent are hereby corrected as shown below:

Column 1, line 22, delete the word "delemma" and insert therefor ---dilemma---.

Column 1, line 61, delete "ransceiver" and insert therefor ---transceiver---.

Column 2, line 18, delete the word "surface" and insert therefor ---state---.

Column 3, line 34, delete the word "receiver" and insert therefor ---received---.

Column 4, line 42, delete "if" and insert therefor ---If---.

Column 4, line 47, delete "turns" and insert therefor ---returns---.

UNITED STATES PATENT AND TRADEMARK OFFICE
CERTIFICATE OF CORRECTION

PATENT NO. : 4,164,709

DATED : August 14, 1979

INVENTOR(S) : Herbert E. Tudor and Frank F. Hrlic

It is certified that error appears in the above–identified patent and that said Letters Patent are hereby corrected as shown below:

Column 5, line 40, after the words "coil 148" delete the word "to" and insert therefor ---of---.

Column 6, line 21, delete "transformers and insert therefor ---transformer---.

Column 6, line 51, after "audio" insert ---output---.

Signed and Sealed this

Fourth Day of March 1980

[SEAL]

Attest:

SIDNEY A. DIAMOND

Attesting Officer

Commissioner of Patents and Trademarks